United States Patent
Zou

(10) Patent No.: US 11,108,322 B2
(45) Date of Patent: Aug. 31, 2021

(54) DUAL-MODE CONTROL OF A SWITCH MODE POWER SUPPLY

(71) Applicant: SEMICONDUCTOR COMPONENTS INDUSTRIES, LLC, Phoenix, AZ (US)

(72) Inventor: Han Zou, Gilbert, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/674,221

(22) Filed: Nov. 5, 2019

(65) Prior Publication Data

US 2021/0119532 A1 Apr. 22, 2021

Related U.S. Application Data

(60) Provisional application No. 62/916,053, filed on Oct. 16, 2019.

(51) Int. Cl.
*H02M 3/156* (2006.01)
*H02M 3/335* (2006.01)

(52) U.S. Cl.
CPC ....... *H02M 3/156* (2013.01); *H02M 3/33507* (2013.01)

(58) Field of Classification Search
CPC .......................... H02M 3/156; H02M 3/33507
See application file for complete search history.

(56) References Cited

U.S. PATENT DOCUMENTS

| 6,465,993 | B1* | 10/2002 | Clarkin | H02M 3/156 323/272 |
| 7,855,539 | B1 | 12/2010 | Wong et al. | |
| 10,498,237 | B1* | 12/2019 | Lin | H02M 3/158 |
| 2006/0208715 | A1* | 9/2006 | Saeki | H02M 3/1588 323/282 |
| 2010/0320983 | A1* | 12/2010 | Wu | H02M 3/1584 323/283 |
| 2011/0006853 | A1* | 1/2011 | Mohtashemi | H02M 3/156 332/110 |
| 2012/0262961 | A1* | 10/2012 | Chien | H02M 3/33507 363/84 |
| 2015/0102788 | A1* | 4/2015 | Dally | H02M 3/156 323/271 |

(Continued)

*Primary Examiner* — Fred E Finch, III
*Assistant Examiner* — Kevin H Sprenger
(74) *Attorney, Agent, or Firm* — Brake Hughes Bellermann LLP

(57) ABSTRACT

A multi-phase switch-mode power supply to control an output in two possible modes is disclosed. A first mode can be applied for normal load conditions. In the first mode, control is achieved using an error signal based on a difference between an output voltage and a set voltage level. In heavy load conditions a load attempts to draw too more power than the switch-mode power supply can provide. As a result, control of the output voltage is lost and the current of each phase becomes saturated at a limit. When this condition is detected, a second mode can be applied. In the second mode, control is achieved using an error signal based on a difference between an output current and a set current level. The set current level is chosen so that the current of each phase is no longer saturated and control of the output current is maintained.

20 Claims, 7 Drawing Sheets

(56) References Cited

U.S. PATENT DOCUMENTS

| | | | |
|---|---|---|---|
| 2015/0349649 A1* | 12/2015 | Zane | H02M 1/4241 |
| | | | 363/21.03 |
| 2016/0118881 A1* | 4/2016 | Schmitz | H02M 3/157 |
| | | | 323/271 |
| 2016/0126837 A1* | 5/2016 | Tschirhart | H02M 3/158 |
| | | | 323/271 |
| 2017/0188433 A1* | 6/2017 | Chen | H05B 45/46 |
| 2017/0250620 A1* | 8/2017 | White | H05B 45/37 |
| 2017/0317580 A1 | 11/2017 | Lyles et al. | |
| 2018/0175730 A1* | 6/2018 | Leong | H02M 1/088 |
| 2019/0190391 A1* | 6/2019 | Takahashi | H02M 1/08 |
| 2020/0228009 A1* | 7/2020 | Jin | H02M 1/14 |

\* cited by examiner

DUAL-MODE CONTROL OF A SWITCH MODE POWER SUPPLY

CROSS-REFERENCE TO RELATED APPLICATIONS

This application claims the benefit of U.S. Provisional Patent Application No. 62/916,053, filed on Oct. 17, 2019, the entire contents of which is incorporated herein by reference.

FIELD OF THE DISCLOSURE

The present disclosure relates to switching power supplies and more specifically, to circuits and methods for controlling current in a multi-phase switching power supply.

BACKGROUND

Electronics for processing may require large amounts of power, and the requirements for power may change according to a load. For example, a processor core may consume more power when a processing task is large (i.e., a heavy load) than when it is small (i.e., a light load, a normal load). Many applications (e.g., servers, AI, graphics) require more than one processor core. The processor cores may be powered by a regulated power supply (i.e., core supply) that can provide the power necessary at heavy loads and at light loads. Often a switching power supply is used for this purpose because of its high efficiency and a small size. To handle high currents, such as required under heavy loads, the switching power supply may include multiple phases. Phase currents produced by each phase can be added at the output of a multi-phase switching power supply to deliver high current without overheating any particular phase. Further to this end, phase currents may be balanced so that no particular phase outputs significantly higher (or lower) current than any other. Sometimes during a heavy load condition, in which a load attempts to draw a large amount of current, the multi-phase switching power supply must limit its output current to prevent damage. Accordingly, a multi-phase switching power supply may include current limiting. It is in this context that implementations of the disclosure arise.

SUMMARY

In one general aspect, the present disclosure generally describes a multi-phase core supply that includes a pulse width modulation (PWM) controller, a current status processing circuit, and a multi-mode error amplifier. The PWM controller is configured by an error signal to provide switching signals to a plurality of phases. Each switching signal controls a phase to output an output voltage and a phase current. The current status processing circuit is configured to sense the phase current from each phase and to compare each sensed phase current to a phase-current limit to determine a heavy load condition or a normal load condition. The current status processing circuit is further configured to sum the sense phase currents to produce a sum current that corresponds to the output current of the multi-phase core supply. The multi-mode error amplifier is coupled between the current status processing circuit and the PWM control. The multi-mode error amplifier is configured to generate the error signal based on the sum current when the heavy load is determined and is configured to generate the error signal based on the output voltage when the normal load condition is determined.

In another aspect, the present disclosure generally describes a method for controlling a multi-phase core supply. The method includes sensing phase current of each phase of the multi-phase core supply. The method also includes comparing the phase currents to a phase-current limit to determine a heavy load condition or a normal load condition. The method further includes generating an error signal. When a normal load condition is determined, the error signal is based on a comparison between an output voltage and a set voltage. When a heavy load condition is determined, the error signal is based on a comparison between an output current and an overall current limit (i.e., a set current). The method also includes controlling switching of each phase of the multi-phase core supply based on the error signal.

In another aspect, the present disclosure generally describes a switch mode power supply. The switch mode power supply includes a PWM controller that is configured to generate a switching signal based on an error signal. The switch mode power supply further includes a buck converter that is coupled to the PWM controller. The buck converter is configured by the switching signal to output a voltage and a current to a load. The switch mode power supply further includes a feedback control circuit that is configured to adjust an error signal to regulate the current or the voltage depending on a detected current. Upon detecting that the current is at (or above) a saturated level, the feedback control circuit is configured to adjust the error signal based on a set current level to regulate the current (e.g., below the saturated level). Upon detecting that the current is below the saturated level, the feedback control circuit is configured to adjust the error signal based on a set voltage level to regulate the voltage.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
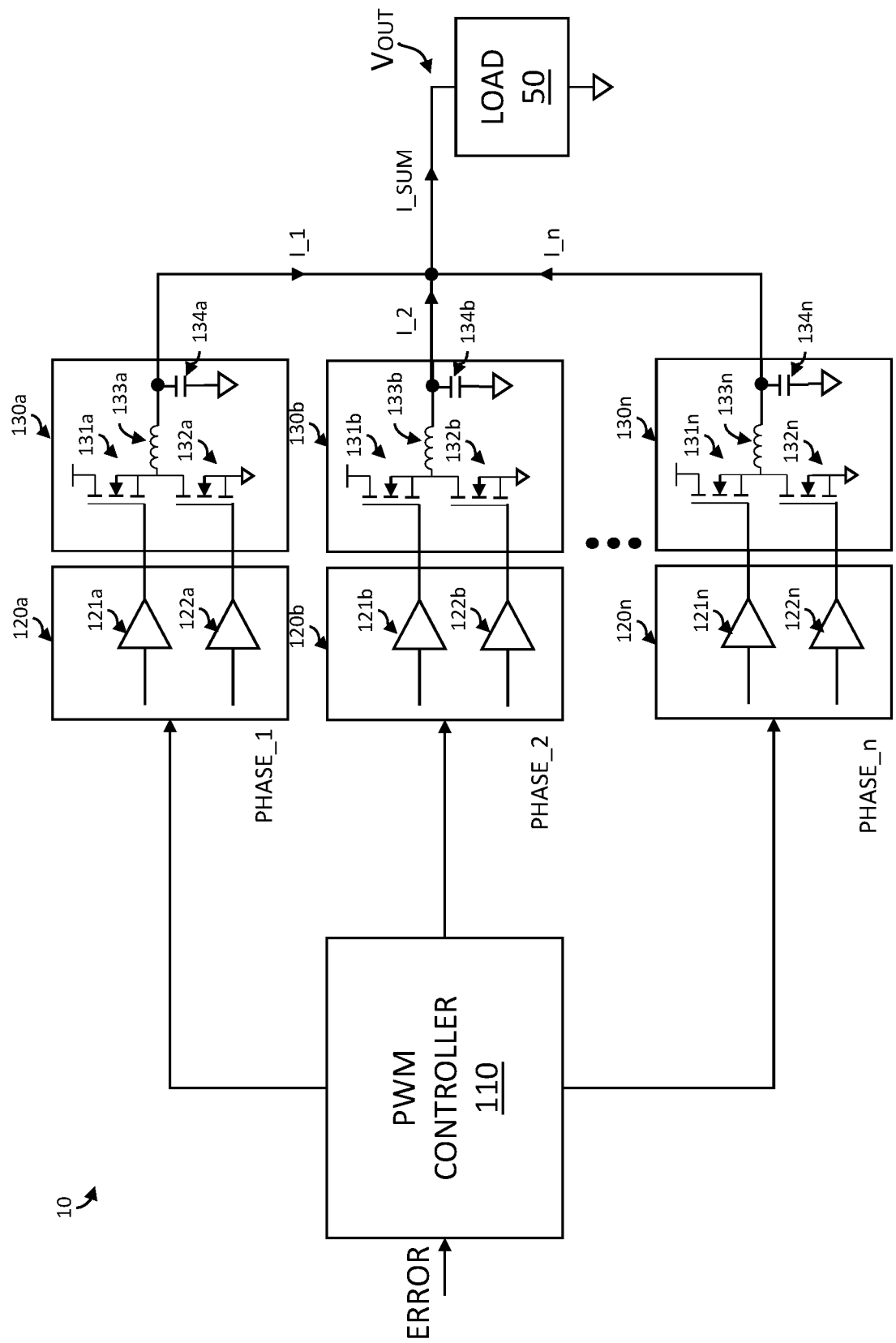
FIG. 1 depicts a system block diagram of a multiphase switching power supply.

High density (i.e., multi-core) computing and/or graphic micro-processor systems may push a phase current of a multi-phase power supply to a limit (i.e., saturation).

Accommodating this heavy-load operation can increase in size and cost of each phase if not compensated for through current limiting. The total current of all phases of the power supply may be limited but this approach is inaccurate and slow because it is based on the average current of the phases. The current of each phase may be limited (or not limited) for each cycle of a pulse width modulated (PWM) switching signal (i.e., on a cycle-by-cycle basis) but this form of limiting alone can also lead to problems. For example, in the limited condition, the power supply may behave like a constant current source. Accordingly, while the output current is fixed at a maximum (i.e., saturated) value, a regulated voltage output may drop as a load tries to draw more current until it becomes unregulated. Additionally, an inductor at an output of a phase may overheat if a maximum phase current is held for too long a time. The effects of this overheating may become even more pronounced because current balancing of the phases, to evenly distribute a thermal load among the phases, is impossible when one or more are limited (i.e., clamped) at a maximum current. Finally, when the high load condition ends (i.e., returns to a norm load condition) the energy storage devices at the output of a saturated phase discharge, producing voltage ringing. The voltage ringing can cause stress on components and, in some cases, can exceed an overvoltage protection (OVP) threshold and trigger a shutdown.

The present disclosure embraces circuits and methods to improve the response of a multiphase (switching) power supply (i.e., core supply) to heavy loads. The disclosed approach includes cycle-by-cycle phase-current limiting (i.e., phase peak current control) and therefore maintains accuracy and a fast-transient response; however, after a period of cycle-by-cycle phase-current limiting, the disclosed approach transitions to a current regulation at a lower level to provide thermally safe regulation and prevent excessive ringing at the end of the heavy load condition. In other words, a phase peak current control can be improved through the use of the disclosed approach. Initially (i.e., at a beginning of a high load condition), the output current of the power supply may be controlled based on a peak current of each phase. Later, after all (or a portion) of the phases become saturated, the output current of the power supply may be controlled based on an average (i.e., overall) current of the phases (i.e., a sum of the phase currents). This coordinated (peak and average) current control approach offers advantages to speed, stability, and safety (i.e., as compared to an uncoordinated current control approach). Additionally, the coordinated (i.e., multimode) current control approach allows the closed loop system to remain active in heavy load (i.e., overcurrent) conditions. Accordingly, the power supply (i.e., regulator) never loses control output, as described above.

FIG. 1 depicts a power supply according to an implementation of the present invention. The power supply can include a pulse width modulation (PWM) controller configured to output switching signals to a plurality of phases (PHASE_1, PHASE_2, PHASE_n). Each phase may be implemented as a voltage converter (i.e., voltage regulator), such as a buck converter, that can be configured by the switching signals to generate an output voltage ($V_{OUT}$). Each phase may include a driver 120a, 120b, 120n and a power stage 130a, 130b, 130n. The power stage of each phase may include a high-side (i.e., H/S) switching device 131a, 131b, 131n, such as a metal oxide semiconductor field effect transistor (MOSFET), that is coupled between an upper voltage (i.e., supply voltage, upper rail voltage) and an output node (i.e., a high-side MOSFET) and a low-side (i.e., L/S) switching device (e.g., MOSFET) 132a, 132b, 132n that is coupled between a lower voltage (e.g., ground, lower rail voltage) and the output node. (i.e., a low-side MOSFET). The high-side switching device and the low-side switching device may be coupled in series between a supply voltage and a ground. The driver of each phase includes a first amplifier 121a, 121b, 121n configured to drive a controlling terminal (e.g., a gate terminal) of the first switching device and a second amplifier 122a, 122b, 122n configured by the switching signals to drive a controlling terminal (e.g., a gate terminal) of the second switching devices.

The switching signals can control driver of each phase to alternatively turn the first and second switching devices ON/OFF in complementary fashion. One complementary ON/OFF corresponds to a cycle of the PWM (i.e., a cycle). During each cycle an output inductor 133a, 133b, 133n that is coupled to the output node can be alternatively coupled to the upper (e.g., supply) voltage and the lower (e.g., ground) voltage. In other words, during a first portion of a cycle, the driver can configure (e.g., turn ON) the high-side switching device to couple the output inductor to the supply voltage, and during a second portion of the cycle, the driver can configure (e.g., turn ON) the low-side switching device to couple the output inductor to the ground. The output inductor coupled between the high-side switching device and the low-side switching device is thus charged for a first portion of cycle and discharged for a second portion of the cycle. In some implementations, the phase driver circuit is configured to reduce the first portion of the cycle to limit phase current if the sensed phase current is at or above the phase-current limit. In some implementations, each phase includes an output capacitor 134a, 134b, 134n to smooth variations (i.e., ripple) in the regulated output voltage $V_{OUT}$, though it is possible that all phases share a common output capacitor.

Each phase can output a regulated voltage ($V_{OUT}$) and a phase current I_1, I_2, I_n. The regulated voltage of each phase may be adjusted to be similar (e.g., the same $V_{OUT}$) while the phase current of each phase may be the same or different. For example, the currents of the phases may be adjusted (i.e., balanced) for various purposes, such as to make each phase operate at a similar (e.g., the same) temperature.

The outputs of the phases (PHASE_1, PHASE_2, PHASE_n) can be coupled together so that a load 50 (e.g., a processor core) attached to an output of the core supply can receives a regulated voltage, $V_{OUT}$, at a current, I_SUM, that is the sum of the phase currents (I_1, I_2, I_n). The use of multiple phases can allow the core supply 10 to output a large current to the load 50 using practically-sized electronic components for each phase. The maximum output current of a phase can correspond to a size of the output inductor 133a, 133b, 133n of the phase, and a maximum current of a phase may be the current at which the output inductor of the phase becomes saturated.

The output voltage $V_{OUT}$ of each phase can be increased or decreased for regulation according to the switching signals provided to each phase from the PWM controller. For example, to increase the output voltage for a phase, the first switching device may be configured to be ON for a longer period of a PWM cycle (i.e., cycle) than the second switching device is configured to be ON. In other words, the duty cycle of the ON/OFF state of the first and second switched may be adjusted. For example, the duration of a cycle that a first switching device 131a, 131b, 131n is ON may be reduced to decrease the output voltage and/or the output current of a phase. Accordingly, limiting the current of a phase may include extending the OFF time of the first switching device 131a, 131b, 131n during each cycle that the output current is exceeds (or is equal to) a maximum phase current threshold. This form of current limiting is referred to herein as cycle-by-cycle phase current limiting, peak phase current limiting, or simply phase current limiting.

Cycle-by-cycle phase current limiting can protect components in the core supply from damage due to overheating by limiting a peak current per phase, therefore can expand design options (e.g., reduce cost/size of components). This form of current limiting is an open loop control of the power supply. Accordingly, it may rely on timer-based latch circuit or output under voltage protection to save the power supply from an undervoltage condition or an overtemperature condition. There are several potential problems with cycle-by-cycle phase current limiting.

A first potential problem with cycle-by-cycle phase current limiting is that a time each phase may stay in its peak current may be limited by thermal considerations, especially for compact (i.e., physically small) power supplies in which a (relatively small) inductor 133a, 133b, 133n can easily become overheated and saturated. Additionally, this open loop control of the phase current may lead to an unregulated voltage output because as a load attempts to draw more current a maximum output power is reached, and the power supply reduces its output voltage to deliver more current. The reduction of the output voltage may be reinforced by the feedback of the power supply until the output becomes unregulated.

A second potential problem with cycle-by-cycle phase current limiting is that phase current balancing becomes difficult when one or more phases are limited. For example, when all of the phases are limited it is impossible to adjust the phases to balance the current between them. Accordingly, variations in the thermal properties of each phase may lead to hot spots in a power supply integrated circuit (IC) if not compensated for through current balancing.

A third potential problem with cycle-by-cycle phase current limiting can occur when a heavy load (e.g., overload) condition causes the power supply to reduce $V_{OUT}$ (so that the output current can be increased). When the overload condition ends, the lowered $V_{OUT}$ recovers to its regulated level but not before a voltage overshoot resulting from the inductor 133a, 133b, 133n releasing stored energy. This voltage overshoot can trigger an overvoltage shutdown (e.g., of the load 50).

Disclosed herein is a multiphase core supply configured to control a regulated output using different modes depending on states (i.e., limited/not-limited) of the phase currents in order to mitigate or eliminate (at least) the problems associated with cycle-by-cycle phase current limiting mentioned. In other words, the disclosed circuits and methods may provide the advantages if cycle-by-cycle phase current limiting without its potential problems. Accordingly, the cycle-by-cycle current limiting (i.e., current control) may be referred to herein as coordinated phase current control or enhanced phase current control.

Figure 2:
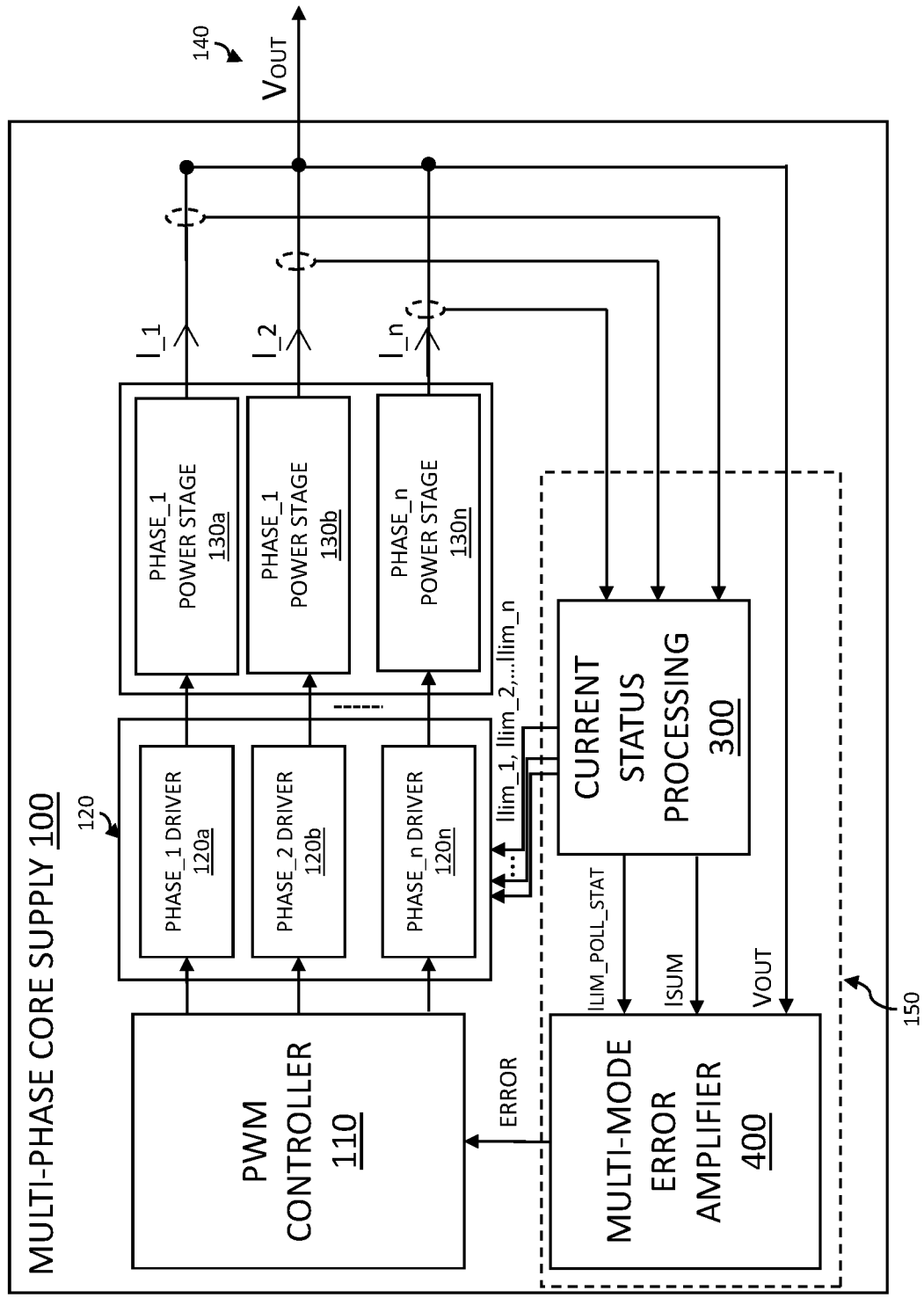
FIG. 2 depicts a block diagram of a multiphase core supply according to an implementation of the present disclosure.

An implementation of the disclosed multiphase core (i.e., processor) power supply (i.e., regulator) is shown in FIG. 2. The multi-phase core supply 100 (i.e., core supply) includes a PWM controller 110 configured to control a plurality of phases (PHASE_1, PHASE_2, PHASE_n). The phases include drivers 120a, 120b, 120n configured by switching signals from the PWM controller 110 to switch the power stages 130a, 130b, 130n to produce phase currents I_1, I_2, I_n and an output voltage $V_{OUT}$. Operation of this portion of the core supply 100 is as described for FIG. 1. That is, the switching signals produced by the PWM controller 110 are based on an error signal generated based on signal fed back from the output 140 of the core supply.

The feedback signals include signals corresponding to the phase currents. While these signals may be voltages or currents from sensors coupled to each phase output, each of these feedback signals will simply be referred to herein by the phase current they represent (i.e., I_1, I_2, I_n). Additionally, the feedback signals include a signal corresponding to the output voltage, $V_{OUT}$.

The core supply 100 includes a feedback control circuit 150 that receives the feedback signals, and based on the feedback signals, generates (i) an error signal (ERROR) for the PWM controller and (ii) phase limit signals (Ilim_1, Ilim_2, Ilim_n) for the phase drivers 120. Accordingly, the feedback control circuit 150 can control the current limiting for each phase as well as the closed loop system response that regulates the output. The feedback control circuit 150 includes a current status processing unit (i.e., circuit, block) configured to determine the status of each phase current relative to a saturated (i.e., maximum, limited) level. For example, the current status processing unit can be configured to determines if each phase current satisfies a condition, such as being at (or above) a per-phase current-limit threshold.

Figure 3:
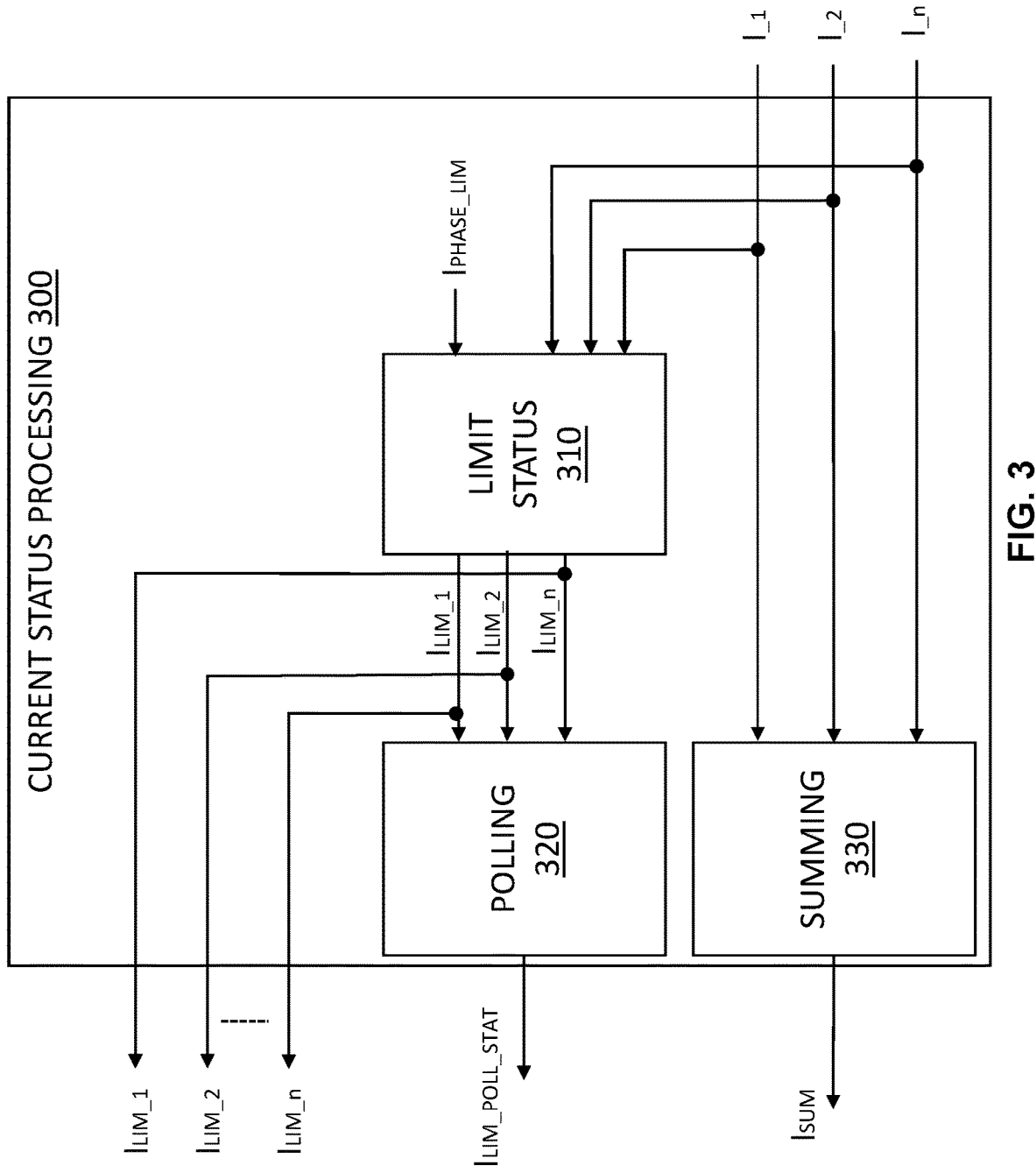
FIG. 3 depicts a current status processing block suitable for the multi-phase core supply of FIG. 2.

FIG. 3 illustrates a block diagram of the current status processing circuit (i.e., current status processing) 300 according to an implementation of the present disclosure. The current status processing 300 receives a sensed output current from each phase (i.e., I_1, I_2, I_n). For example, the current status processing may receive sensed phase currents at each cycle of the PSM controller (i.e., on a cycle-by-cycle basis). The sensed phase currents may be analog voltage signals corresponding to output currents of each phase.

The current status processing 300 includes a summing circuit (i.e., summing) 330 that is configured to receive the sensed phase currents (i.e., phase currents) from all of the phases (i.e., 1, 2, . . . , n). The summing circuit 330 is further configured to output a sum current signal ($I_{SUM}$) that corresponds to the summation of the sensed phase current signals (i.e., phase current levels). The sum current signal (i.e., sum current, output current, overall phase current) may be an analog voltage signal that corresponds to the output current of the multi-phase core supply. Accordingly, the sum current and the output current may be referred to interchangeably in the disclosure. The sum current signal is also proportional to an average value of the sensed phase currents.

The current status processing 300 further includes a limit status circuit (i.e., limit status) 310. The limit status circuit 310 is configured to receive the sensed phase currents from all (or a portion) of the phases. The limit status circuit 310 is further configured to receive one or more reference signals corresponding to a current limit for a phase. For example, as shown in FIG. 3, the limit status circuit 310 may receive a set (i.e., reference) phase-current limit level ($I_{PHASE\_LIM}$). The limit status circuit 310 can include a plurality of comparators, with each comparator configured to compare one of phase currents with the phase-current limit (i.e., phase limit) set as a reference. Based on each of these comparisons, the limit status circuit may output a plurality of phase limit signals ($I_{LIM\_1}$, $I_{LIM\_2}$, $I_{LIM\_n}$). The phase limit signal may be binary signals that correspond to the comparison. For example, a phase limit signal for a particular phase current may be a voltage corresponding to a binary high level (i.e., HIGH) when the particular phase current is at or above the phase-current limit and a voltage corresponding to a binary low level (i.e., LOW) when the particular phase current is below the phase-current limit. Accordingly, the plurality of phase limit signal ($I_{LIM\_1}$, $I_{LIM\_2}$, $I_{LIM\_n}$) may include HIGH and LOW signals corresponding to the limit status of each phase current. The phase limit signals can trigger current control at each phase (i.e., peak current limiting) or, as will be discussed, can trigger an overall current control (i.e., average current limiting).

The current status processing 300 is further configured to output the plurality of phase limit signals ($I_{LIM\_1}$, $I_{LIM\_2}$, $I_{LIM\_n}$). Returning to FIG. 2 the phase limit signals may be coupled to the phase driver circuits 120 to adjust the output of each phase. For example, a phase limit signal indicating that a phase current is above the phase-current limit may configure the driver to reduce a duration that a high-side MOSFET is ON in a first PWM cycle in order to reduce (i.e., limit) the output current of the particular phase. In a second PWM cycle (i.e., subsequent to the first PWM cycle), the reduction of the phase current (i.e., in the previous cycle) may result in a phase limit signal that does not reduce a duration of an ON condition of the high-side MOSFET. In other words, the phase limit signals can be updated on a cycle-by-cycle basis in order to limit a phase current on a cycle-by-cycle basis. This limiting has a fast response because the PWM controller cycles at a high rate (e.g., 100 MHz).

The current status processing 300 further includes a polling circuit (i.e., polling) 320. The polling circuit is configured to receive the plurality of phase limit signals ($I_{LIM\_1}$, $I_{LIM\_2}$, $I_{LIM\_n}$) from the limit status circuit 310. The polling 320 may include logic gates (e.g., AND, OR, etc.) that can determine when all (or a portion) of the phase currents are at or above the phase-current limit ($I_{PHASE\_LIM}$). In other words, the polling circuit 320 is configured to take a poll to determine how many phase currents are at or above the phase-current limit. For example, the polling circuit 320 may output a phase-current limit polling status signal ($I_{LIM\_POLL\_STAT}$) that corresponds to a limit state of all (or a portion) of the phases. In a possible implementation, the phase current limit polling status signal (i.e., polling status) may be a binary signal that is HIGH when all phases are being limited and LOW otherwise. Based on the HIGH/LOW state of the polling status, the multi-phase core supply 100 can be configured to control the output 140 according to one of two possible control modalities (i.e., modes). Accordingly, the feedback control circuit 150 of the multi-phase core supply 100 includes a multi-mode error amplifier 400, as shown in FIG. 2.

Figure 4:
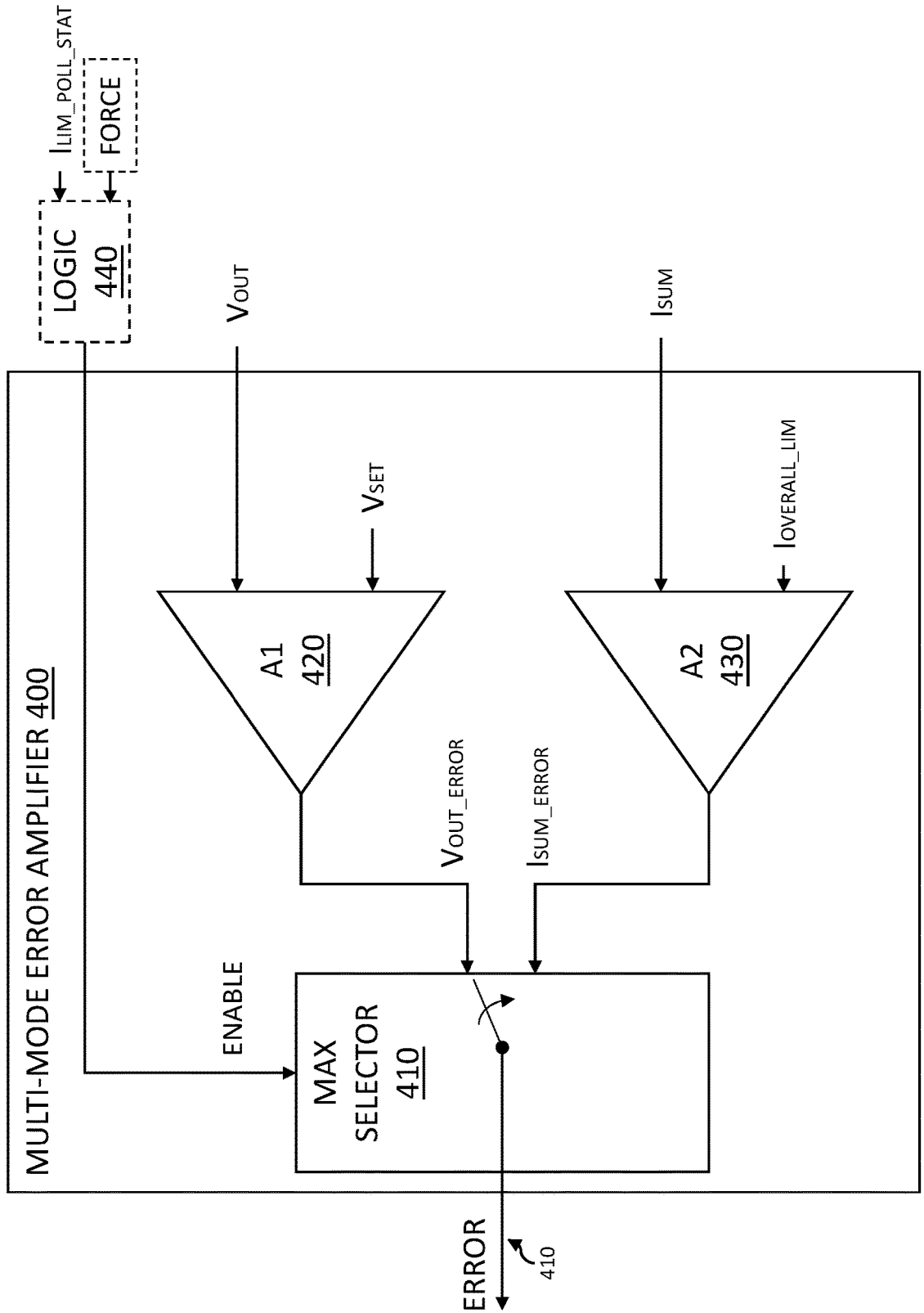
FIG. 4 depicts a multi-mode error amplifier block suitable for the multi-phase core supply of FIG. 2.

FIG. 4 illustrates a multi-mode error amplifier circuit (i.e., multi-mode error amplifier) 400 according to a possible implementation of the present disclosure. The multi-mode error amplifier can be configured to receive the sum current signal ($I_{SUM}$) from the current status processing 300. The multi-mode error amplifier 400 can be further configured to receive the output voltage ($V_{OUT}$) of the multi-phase core supply 100.

The multi-mode error amplifier 400 includes a first (i.e. voltage mode) differential amplifier (A1) 420 that is configured to compare the output voltage ($V_{OUT}$) with a set voltage ($V_{SET}$) of the core supply. The set voltage $V_{SET}$ (i.e., $V_{DAC}$) is a target regulated voltage level for the core supply. The first differential amplifier 420 is configured to output an output voltage error signal ($V_{OUT\_ERROR}$) based on the comparison (e.g., difference) between $V_{OUT}$ and $V_{SET}$.

The multi-mode error amplifier 400 includes a second (i.e., current mode) differential amplifier (A2) 430 that is configured to compare the overall output current (i.e., $I_{SUM}$) with an overall output current limit ($I_{OVERALL\_LIM}$) for the core supply. The overall output current limit (i.e., overall current limit) is a target regulated current level for the core supply. The second differential amplifier 430 is configured to output an overall current error signal ($I_{SUM\_ERROR}$) based on the comparison (e.g., difference) between the sum of the phase currents ($I_{SUM}$) and the overall current limit ($I_{OVERALL\_LIM}$). In other words, $I_{SUM\_ERROR}$ corresponds to the difference between the output current (i.e., $I_{SUM}$) and a set value for regulating the output current (i.e., $I_{OVERALL\_LIM}$). The set value for regulating the output current (i.e., $I_{OVERALL\_LIM}$) can be chosen so that the phases are not current limited.

The multi-mode error amplifier 400 includes a max selector circuit 410. The output voltage error signal (i.e., voltage error) is coupled to a first input of the max selector circuit (i.e., max selector) 410. Additionally, the overall current error signal (i.e., overall current error) is coupled to a second input of the max selector 410.

The max selector is also configured to receive a enable signal (ENABLE) that activates or deactivates the max selector based on a logical signal level (HIGH, LOW). For example, a HIGH enable signal can configure the max selector 410 to compare $V_{OUT\_ERROR}$ and $I_{SUM\_ERROR}$ and route the larger of the two (i.e., max($V_{OUT\_ERROR}$, $I_{SUM\_ERROR}$)) to an output 410, while a LOW enable signal can configure the max selector 410 to route $V_{OUT\_ERROR}$ to the output 410. The output of the max selector 410 can be the output of the multi-mode error amplifier 400 and as such, can be coupled to the PWM controller (see FIG. 2), which generates driving signals to minimize the error signal (ERROR).

The multi-mode error amplifier can be configured to operate in a first mode, which generates an error signal to control the PWM controller to adjust the output voltage to minimize a difference between a set voltage and the output voltage. The multi-mode error amplifier can also be configured to operate in a second mode, which generates an error signal to control the PWM controller to adjust the overall current to minimize a difference between an overall current limit and the overall current at the output of the core supply. The state (i.e., HIGH or LOW) of the enable signal can selects which mode the multi-mode error amplifier operates. The multi-mode error amplifier may be referred to as dual-mode error mode amplifier. The dual-mode error amplifier, when configured by the appropriate inputs, can facilitate dual-mode control of the core supply.

The state of the enable signal can be determined by the polling status ($I_{LIM\_POLL\_STAT}$) received from the current status processing 300. The state of the polling status can correspond to the load condition of the core supply. For example, in a heavy load condition, all phases may be at their current limit and in a normal load condition no phase currents are at their current limit. In this situation, the polling status may enable the max selector 410 to route the overall current error as the error signal for the PWM controller for current regulation. In a light load condition, all phases may be below their current limit. In this situation, the polling status may not enable the max selector and as a result, the voltage error may be routed as the error signal for the PWM controller for voltage regulation. Thus, the multi-phase core supply can be configured to control the output voltage in a normal load condition and can be configured to control the output current in a heavy load condition.

In a possible implementation, the state of the enable signal (ENABLE) may be determined by a logical operation between the polling status signal a force signal (FORCE). For example, logic circuitry 440 (e.g., OR gate) may be included so that either a HIGH force signal or a HIGH polling signal can enable the max selector 410. The force signal may be received from an external source to manually configure the mode of operation.

When a heavy (i.e., overload) load condition starts, all phases may become limited (i.e. clamped) at a peak current limit ($I_{PHASE\_LIM}$) according to the phase limit signals (ILIM_1, ILIM_2, ILIM_3). The phase limiting response can happen very quickly (e.g., 50 micro seconds). If this condition persists, control will be lost because each phase is saturated at its limit. In the disclosed approach, however, after some short duration (e.g., 50 microseconds) the system shifts from controlling the output voltage ($V_{OUT}$) to controlling the overall current ($I_{SUM}$). The target current in the current control can be below (i.e. less than) a sum of all the current limited phases (e.g., $I_{OVERALL\_LIM}=0.9 \cdot n \cdot I_{PHASE\_LIM}$) in order to prevent the phase currents from saturating. When saturation is prevented, control of the system is maintained, and the potential problems described previously are minimized or eliminated.

In the heavy (i.e., overload) condition, the output voltage may drop (i.e., $V_{OUT}<V_{SET}$) but the output current ($I_{SUM}$) is regulated. Because the system maintains control, switching signals generated by the PWM controller (e.g., a COMP signal) will not become saturated while still attempting to control an uncontrollable parameter. Accordingly, the switching signals can quickly recover to their normal state when the overload condition ends. This quick recover corresponds to a reduced overshoot in the output voltage when the output voltage returns to the set voltage (i.e. $V_{OUT}=V_{SET}$).

Figure 5:
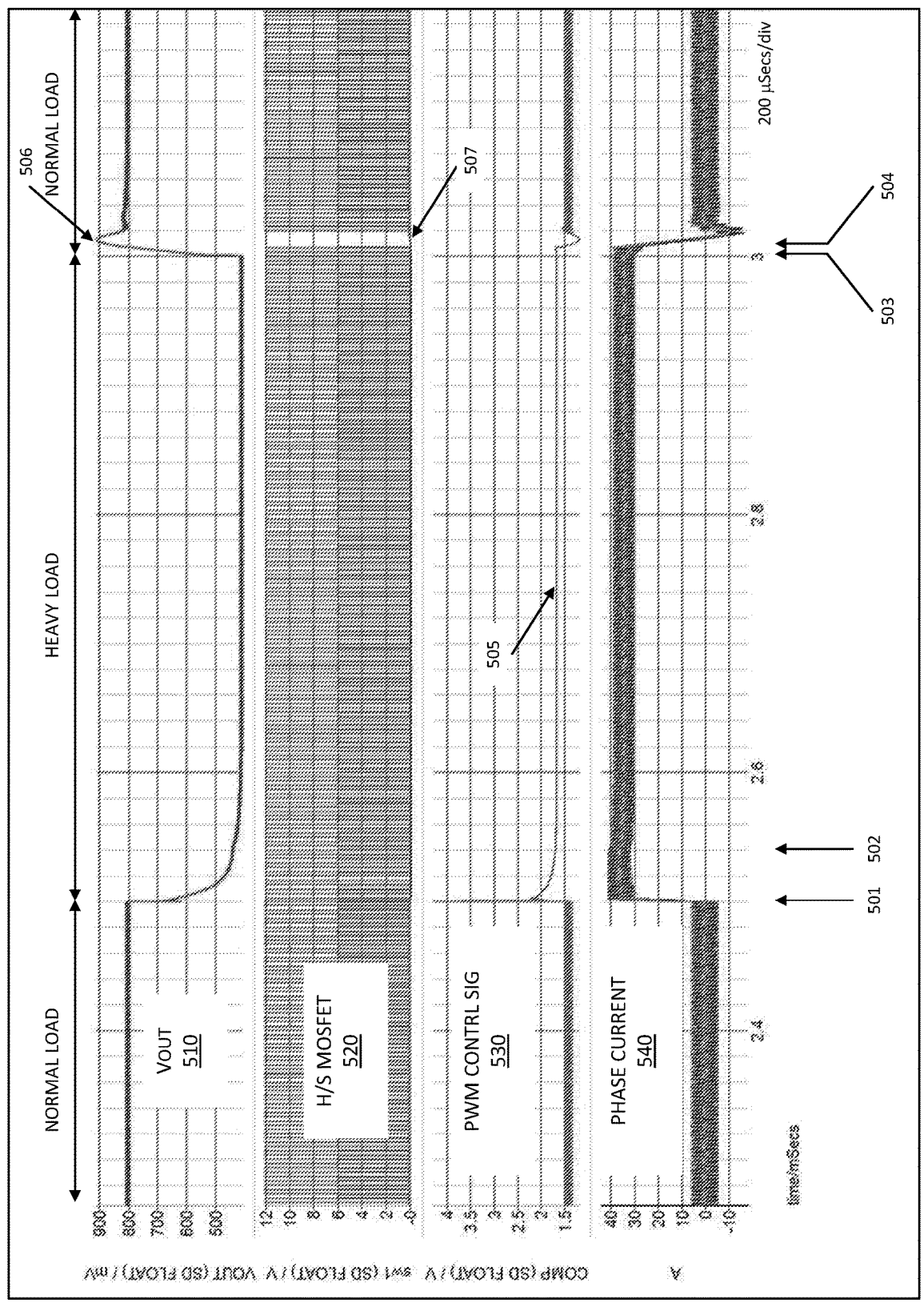
FIG. 5 depicts time-based signals possible in an implementation of the multiphase core supply of FIG. 2.

FIG. 5 illustrates possible signals associated with a phase of the multi-phase core supply 100 of FIG. 2. Four graphs that share a common time axis are included in FIG. 5. The four graphs show four signals as they progress from a normal (e.g., light) load condition to a heavy (e.g. overload) condition at a first time 501 and back to a normal load condition at a second time 503. The four graphs show an output voltage of the phase (i.e., $V_{OUT}$) 510, an output current of the phase (i.e., phase current) 540, a PWM control signal for controlling the switching of a power stage of the phase (i.e., PWM contrl sig) 530, and a gate voltage of a high-side MOSFET in the power stage of the phase (i.e., H/S MOSFET) 520.

As shown in FIG. 5, at the time 501 corresponding to the start of a heavy load condition begins, the phase current 540 rises to a level that corresponds to a phase limited level and the output voltage 510 begins to drop. In order to compensate for the voltage, drop, the PWM control signal 530 begins to rise. Later, at a time 502, the multi-mode error amplifier changes modes and begins to control (i.e., regulate) the phase current 540 to a slightly lower and unsaturated level (i.e., a controllable level). The change of the modes prevents the PWM control signal 530 from saturating, and instead, it is maintained at a heavy-load level 505 that is relatively low in a range of possible levels. At a time 503 corresponding to the end of the heavy load condition, the phase current 540 drops and the multi-mode error amplifier changes modes and begins to control (i.e., regulate) the output voltage again. For control to be established, however, the PWM control signal 530 must recover from its heavy-load level 505, and this recovery continues for a recovery period. Meanwhile, an output inductor of the phase begins to discharge. Accordingly, during the recovery period the output voltage 510 may overshoot 506 a regulated target ($V_{SET}$). After the recovery period the H/S MOSFET switching may be disabled for a period 507 as the inductor discharges. The overshoot 506 of the output voltage 510 is minimized because the heavy-load level 505 of the PWM control signal is maintained at a relatively low level and can recover in a relatively short recovery period. The recovery period can be defined as a period between a time 503 corresponding to a return to a normal load condition from a heavy load condition and a beginning of the period 507 during which the H/S MOSFET is disabled (i.e., turned OFF without being turned ON).

Figure 6:
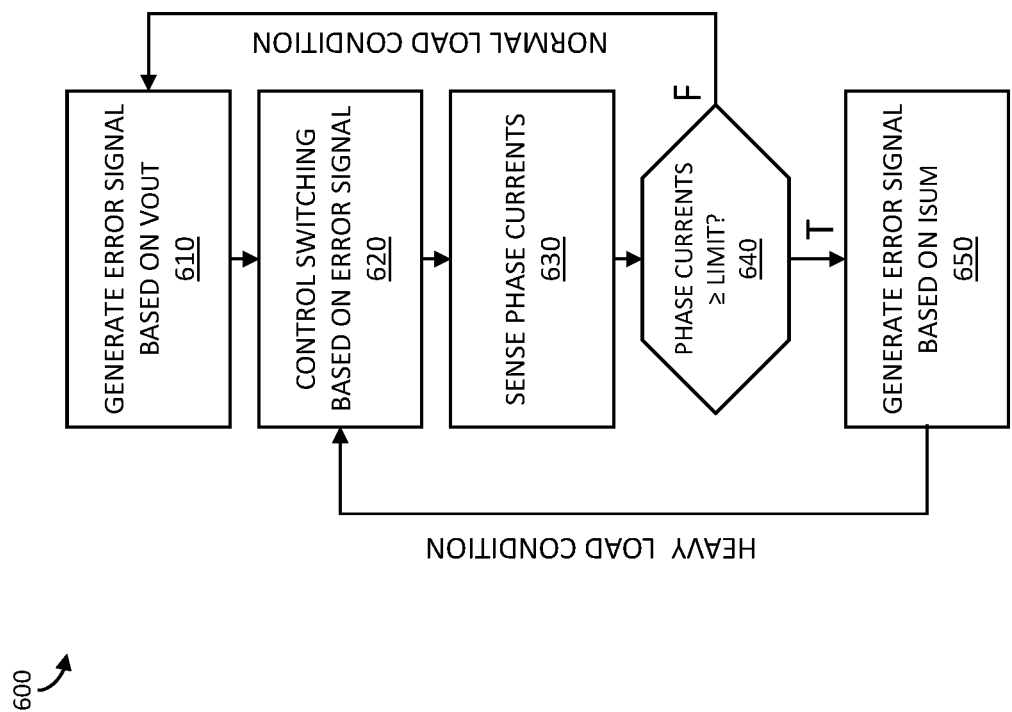
FIG. 6 is a flow chart of a method for controlling a multi-core supply according to a possible implementation of the present disclosure.

FIG. 6 is a flow chart of a method for controlling a multi-phase core supply. The method 600 includes generating 610 an error signal based on an output voltage ($V_{OUT}$) and controlling 620 switching based on the (voltage-based) error signal. This mode of control can be used in normal load conditions when phase currents are not limited. The method includes sensing 630 the phase currents to determine 640 if they are limited (e.g., ≥limit) or not limited (e.g., <limit). If the phase currents are limited, then the method includes generating 650 the error signal based on an output current ($I_{SUM}$) and controlling 620 switching based on the (current-based) error signal. This mode of control can be used in heavy load conditions when phase currents are limited.

The sensing 630 of the phase currents may proceed at each cycle of a PWM controller so that the mode of control matches the load conditions. In a possible implementation, the method also includes limiting the phase current to a phase-current limit (i.e., limiting at a phase) prior to controlling the switching based on a current-based error signal.

Figure 7:
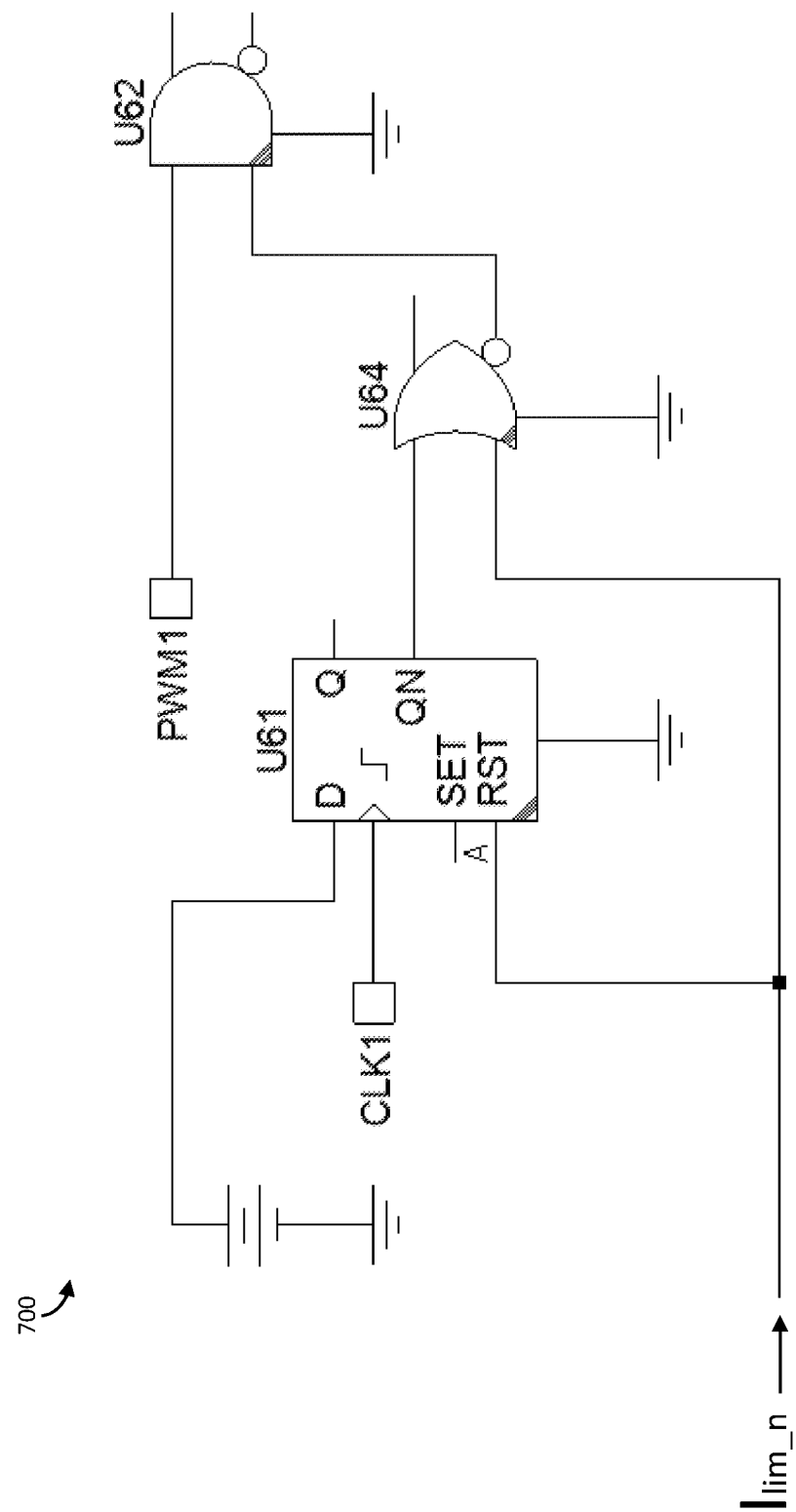
FIG. 7 is a schematic of a circuit for phase current limiting that can be used in a phase driver circuit of the multi-phase core supply of FIG. 2.

FIG. 7 is a schematic of a circuit for phase current limiting that can be used in a phase driver circuit (e.g., PHASE__n DRIVER 120n) of the multi-phase core supply of FIG. 2. At each cycle of the PWM, the circuit receives the limit status (e.g., Ilim_n) for the sensed phase current. The binary level of the limit status signal corresponds to the state of the phase current relative to a limit (i.e., overloaded, not overloaded). The limit status signal for the implementation shown in FIG. 7 is a logical high when the current meets or exceeds the limit (i.e., threshold). In this condition, a flip-flop (U61) is reset. The output of the flip-flop drives logical circuitry along with a switching signal from the PWM (PWM1). When the limit status of the phase current indicates that the phase current meets or exceeds the threshold limit, the PWM signal is blanked (i.e., chopped) so that the phase current at the output of the power stage of the phase is limited. For example, PWM1 may be an ON/OFF switching signal for a H/S MOSFET in the power stage of the phase. This switching signal may be cut short or blanked completely during a cycle so that the phase current is not made larger. At the start of the next cycle, the limit status signal is updated and the process repeats.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It will be understood that, in the foregoing description, when an element, such as a component is referred to as connected to, electrically connected to, coupled to, or electrically coupled to another element, it may be connected or coupled to the other element, or one or more intervening elements may be present. In contrast, when an element is referred to as being directly connected to or directly coupled to another element, there are no intervening elements. Although the terms directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

The invention claimed is:

1. A multi-phase core supply comprising:
a pulse width modulation (PWM) controller configured by an error signal to provide switching signals to a plurality of phases, the switching signals controlling each phase to output an output voltage and a phase current;
a current status processing circuit configured to sense the phase current from each phase and to compare each sensed phase current to a phase-current limit to determine a heavy load condition or a normal load condition, the current status processing circuit further configured to sum the sensed phase currents to produce a sum current that corresponds to an output current of the multi-phase core supply; and
a multi-mode error amplifier coupled between the current status processing circuit and the PWM controller, the multi-mode error amplifier configured to select as an output (i) an output voltage error signal as the error signal in the normal load condition or (ii) the larger of the output voltage error signal and an overall current error signal as the error signal in the heavy load condition.

2. The multi-phase core supply according to claim 1, wherein each phase includes:
a phase driver circuit; and
a power stage including:
a high-side switching device and a low-side switching device coupled in series between a supply voltage and a ground; and
an output inductor coupled between the high-side switching device and the low-side switching device,
wherein during a first portion of a cycle, the driver configures the high-side switching device to couple the output inductor to the supply voltage, and during a second portion of the cycle, the driver configures the low-side switching device to couple the output inductor to the ground, and wherein the phase driver circuit is configured to reduce the first portion to limit phase current if the sensed phase current is at or above the phase-current limit.

3. The multi-phase core supply according to claim 2, wherein the current status processing circuit includes:
a plurality of comparators configured to compare each phase current to the phase-current limit and based on each comparison, generate a phase limit signal, the phase limit signal having one of two possible values based on a result of the comparison; and
a polling circuit configured to determine a polling status based on the values of the phase limit signals for each phase, the polling status signal having one of two possible values: one corresponding to the normal load condition and the other corresponding to the heavy load condition.

4. The multi-phase core supply according to claim 3, wherein a phase driver circuit for each phase is configured by the phase limit signal from the current status processing circuit to limit the phase current when the phase limit signal for the phase indicates that the phase current is at or above the phase current limit.

5. The multi-phase core supply according to claim 1, wherein the multi-mode error amplifier includes:
a voltage-mode differential amplifier configured to generate the output voltage error signal based on a comparison between the output voltage and a set voltage; and
a current-mode differential amplifier configured to generate the overall current error signal based on a comparison between the output current to an overall current limit.

6. The multi-phase core supply according to claim 5, wherein the multi-mode error amplifier includes:
a max selector circuit that is configured to output, as the error signal, the larger of the output voltage error signal and the overall current error signal when the max selector circuit receives a polling status signal corresponding to the heavy load condition.

7. The multi-phase core supply according to claim 6, wherein the polling status signal corresponds to the heavy load condition when all of the phase currents are limited.

8. The multi-phase core supply according to claim 6, wherein the max selector circuit is configured to output, as the error signal, the voltage error signal when the max selector circuit receives a poling status signal corresponding to the normal load condition.

9. The multi-phase core supply according to claim 1, wherein the heavy load condition corresponds to all phase currents of the plurality of phases being limited and the normal load condition correspond to no phase currents of the plurality of phases being limited.

10. The multi-phase core supply according to claim 1, wherein each of the phases is further configured to limit the phase current on a cycle-by-cycle basis when a phase-current limit is at or above a phase-current limit.

11. The multi-phase core supply according to claim 1, wherein:
the multi-phase core supply is configured to control the output voltage in the normal load condition; and
the multi-phase core supply is configured to control the output current in the heavy load condition.

12. The multi-phase core supply according to claim 11, wherein:
the phase currents are not saturated the multi-phase core supply is configured to control the output current in the heavy load condition.

13. A method for controlling a multi-phase core supply, the method comprising:
- sensing phase currents of each phase of the multi-phase core supply;
- comparing the phase currents to a phase-current limit to determine a heavy load condition or a normal load condition;
- selecting, for an output of a multi-mode error amplifier, an error signal based on the determined load condition, the error signal selected being an output voltage error signal when the normal condition is determined and the error signal selected being the larger of the output voltage error signal and an overall current error signal when the heavy load condition is determined; and
- controlling switching of each phase of the multi-phase core supply based on the selected error signal.

14. The method for controlling a multi-phase core supply according to claim 13, further comprising repeating the sensing, the comparing, the selecting, and the controlling for each cycle of a PWM controller of the multi-phase core supply.

15. The method for controlling a multi-phase core supply according to claim 13, wherein the comparing the phase currents to a phase-current limit to determine a heavy load condition or a normal load condition comprising includes taking a poll to determine how many phase currents are at or above the phase-current limit.

16. The method for controlling a multi-phase core supply according to claim 15, wherein all phase currents are at or above the phase-current limit during the heavy load condition, and not all phase currents are at or above the phase-current limit during the normal load condition.

17. The method for controlling a multi-phase core supply according to claim 13, further comprising:
- limiting each phase current to a phase-current limit prior to generating an error signal based on a comparison between an output current and an overall current limit.

18. The method for controlling a multi-phase core supply according to claim 17, further comprising:
- reducing the phase current from the phase-current limit to a controllable level after selecting the error signal as the overall current error signal.

19. A switch mode power supply comprising:
- a pulse width modulator (PWM) controller configured to generate a switching signal based on an error signal;
- a buck converter coupled to the PWM controller configured by the switching signal to output a voltage and a current to a load; and
- a feedback control circuit configured to:
  - upon detecting that the current is at or above a saturated level, selecting as an output the larger of an output voltage error signal and an overall current error signal as the error signal; and
  - upon detecting that the current is below the saturated level, selecting as an output the output voltage error signal as the error signal.

20. The switch mode power supply according to claim 19, wherein the overall current error signal regulates the current to the load at a set current level that is below the saturated level.

\* \* \* \* \*